US011712974B2

(12) United States Patent
Gagnon et al.

(10) Patent No.: US 11,712,974 B2
(45) Date of Patent: *Aug. 1, 2023

(54) BATTERY PACK FOR PERSONAL WATERCRAFT

(71) Applicant: TAIGA MOTORS INC., Lasalle (CA)

(72) Inventors: Marc-Olivier Gagnon, Montreal (CA); Dante Filice, Montreal (CA); Patrick Bernier, Montreal (CA); Jessie Boudreau, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,261

(22) Filed: Nov. 15, 2022

(65) Prior Publication Data

US 2023/0075946 A1 Mar. 9, 2023

Related U.S. Application Data

(63) Continuation of application No. 17/718,415, filed on Apr. 12, 2022, now Pat. No. 11,529,878.

(Continued)

(51) Int. Cl.
*B60L 50/60* (2019.01)
*B63H 21/17* (2006.01)
(Continued)

(52) U.S. Cl.
CPC .............. *B60L 50/66* (2019.02); *B63B 34/10* (2020.02); *B63H 11/08* (2013.01); *B63H 21/17* (2013.01); *B63H 23/34* (2013.01); *B60L 2200/32* (2013.01)

(58) Field of Classification Search
CPC ......... B63L 50/66; B63B 34/10; B63H 11/08; B63H 21/17; B63H 23/34
See application file for complete search history.

(56) References Cited

U.S. PATENT DOCUMENTS 6,857,918 B1 * 2/2005 Lebreux .................. B63B 34/10
440/6
6,890,224 B2 * 5/2005 McCann .................... B63J 2/06
440/38

(Continued)

OTHER PUBLICATIONS

Antony Harris, Sleek "electrojet" wins Innovation Award, Feb. 21, 2019, https://plugboats.com/sleek-electrojet-wins-innovation-award/, accessed on Apr. 4, 2022.

*Primary Examiner* — S. Joseph Morano
*Assistant Examiner* — Jovon E Hayes
(74) *Attorney, Agent, or Firm* — Norton Rose Fulbright Canada LLP

(57) ABSTRACT

A battery enclosure for a personal watercraft is provided. Different configurations of the battery enclosure are disclosed, as well as different arrangements of the battery enclosure within the personal watercraft and with respect to other features of the personal watercraft. According to one embodiment, a personal watercraft includes a deck and a hull defining an interior volume. An electric motor is housed within the interior volume, the electric motor being operable to rotate a drive shaft. A battery pack having a battery enclosure housing one or more batteries is also positioned within the interior volume. A portion of at least one battery of the one or more batteries is positioned vertically above the drive shaft.

20 Claims, 8 Drawing Sheets

Related U.S. Application Data

(60) Provisional application No. 63/193,836, filed on May 27, 2021, provisional application No. 63/180,358, filed on Apr. 27, 2021.

(51) Int. Cl.
*B63H 23/34* (2006.01)
*B63H 11/08* (2006.01)
*B63B 34/10* (2020.01)

(56) References Cited

U.S. PATENT DOCUMENTS 8,979,603 B1 *   3/2015   Rioux ................... B63H 21/36
                                                          440/88 L
9,321,516 B1 *   4/2016   Lafreniere ............ B63H 21/20

* cited by examiner

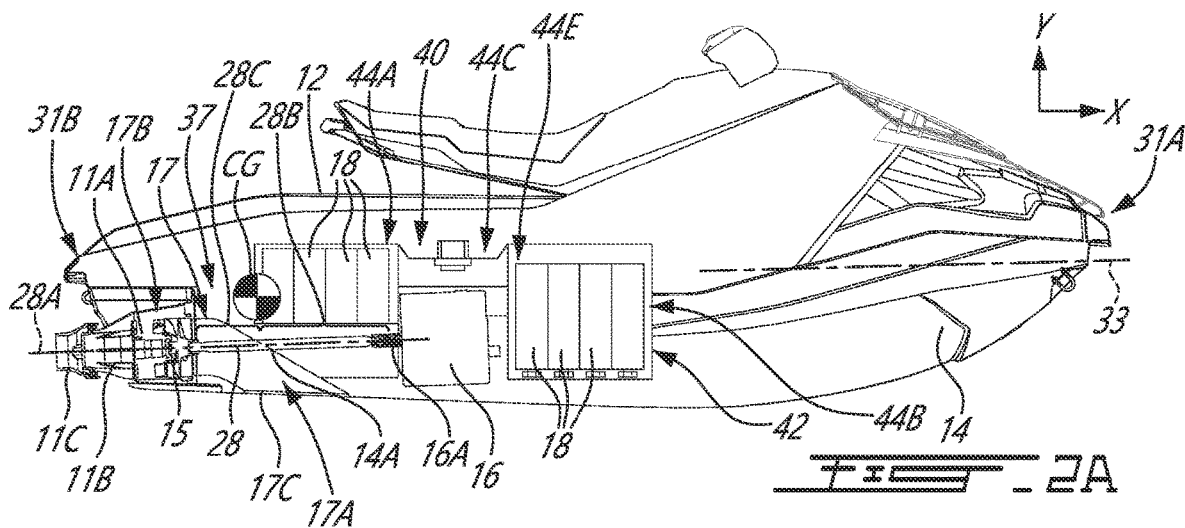
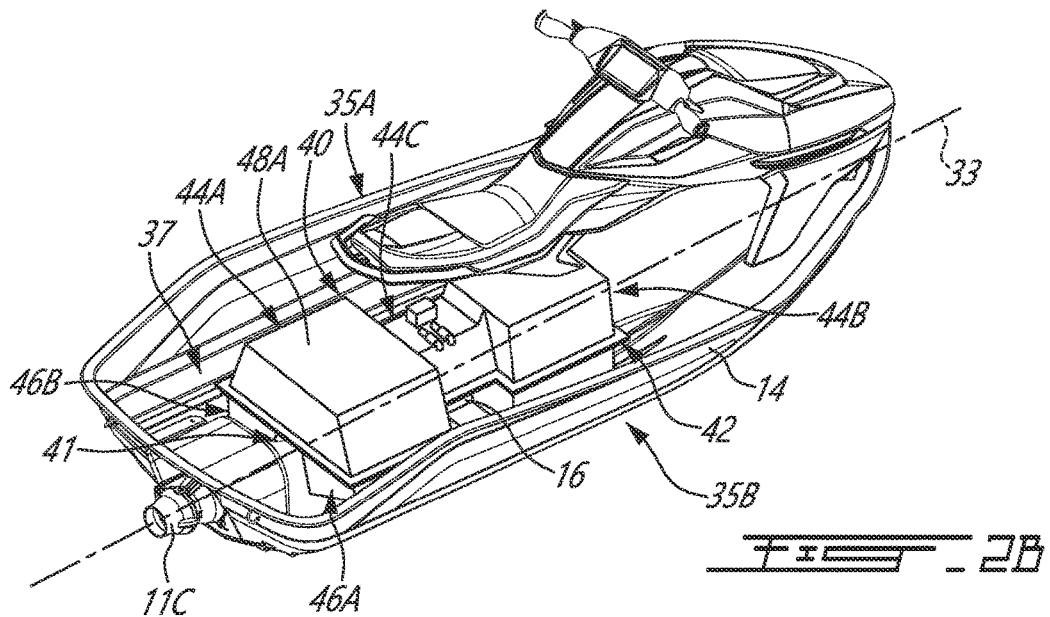
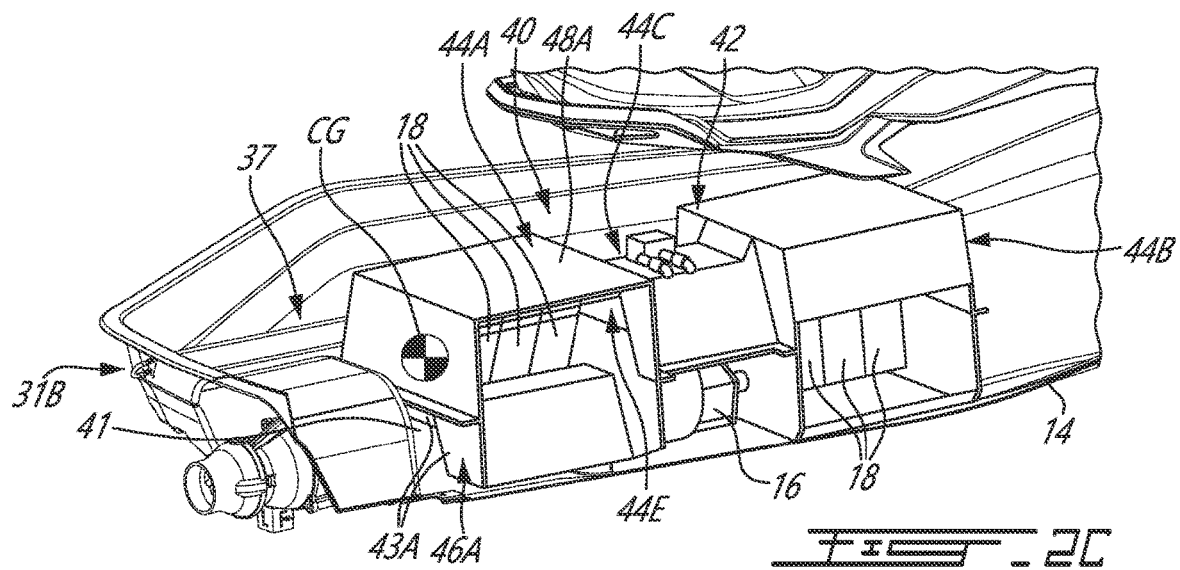

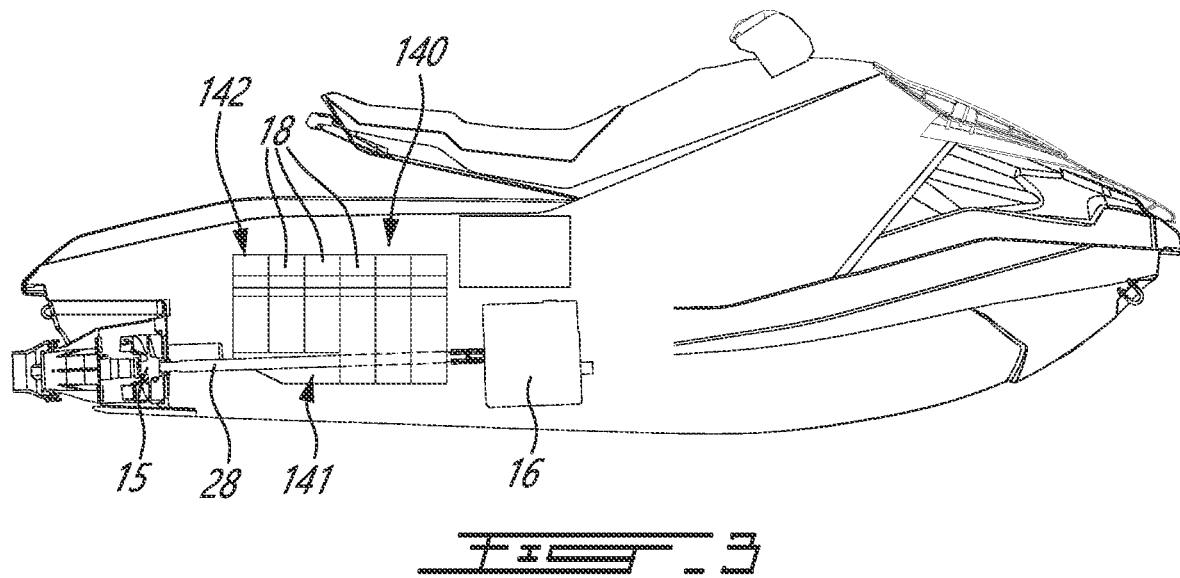
_Fig. 3_
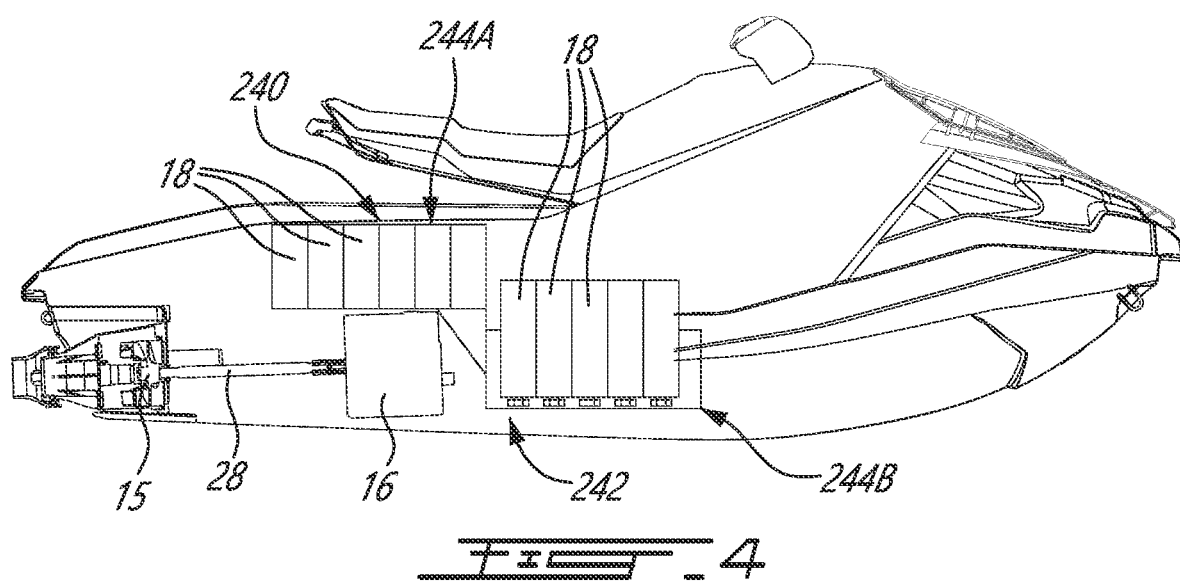
_Fig. 4_

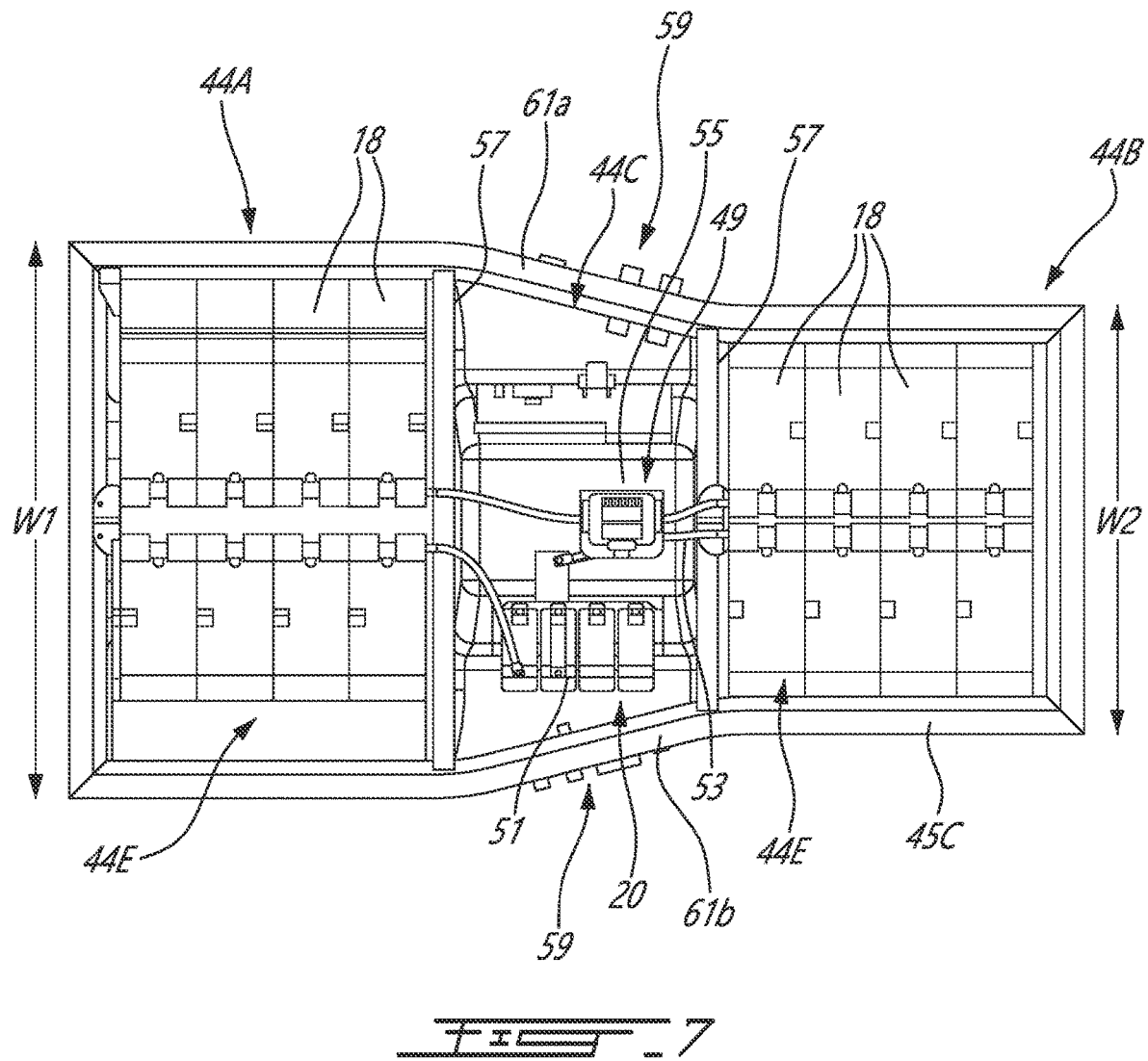

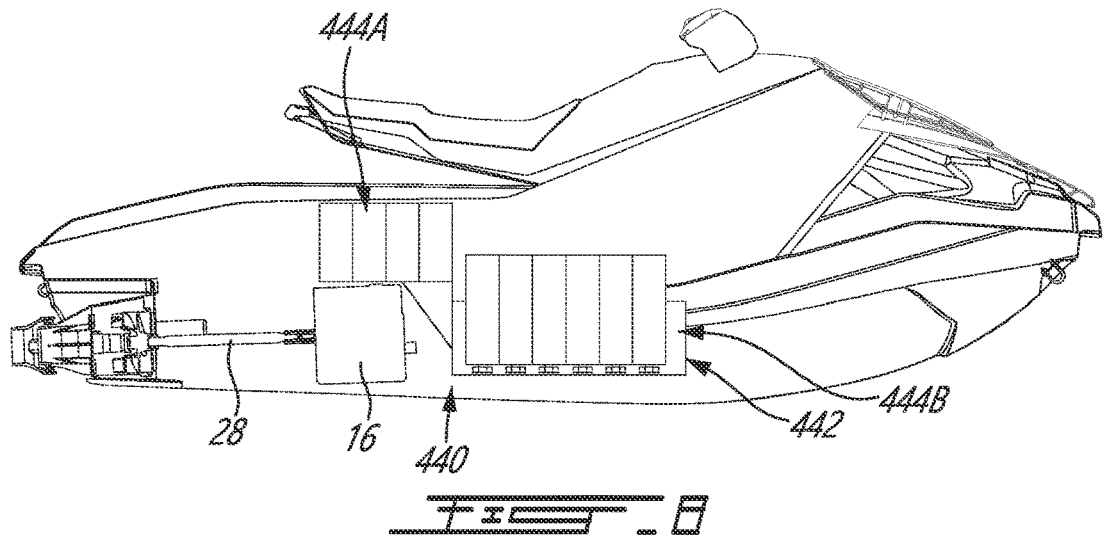
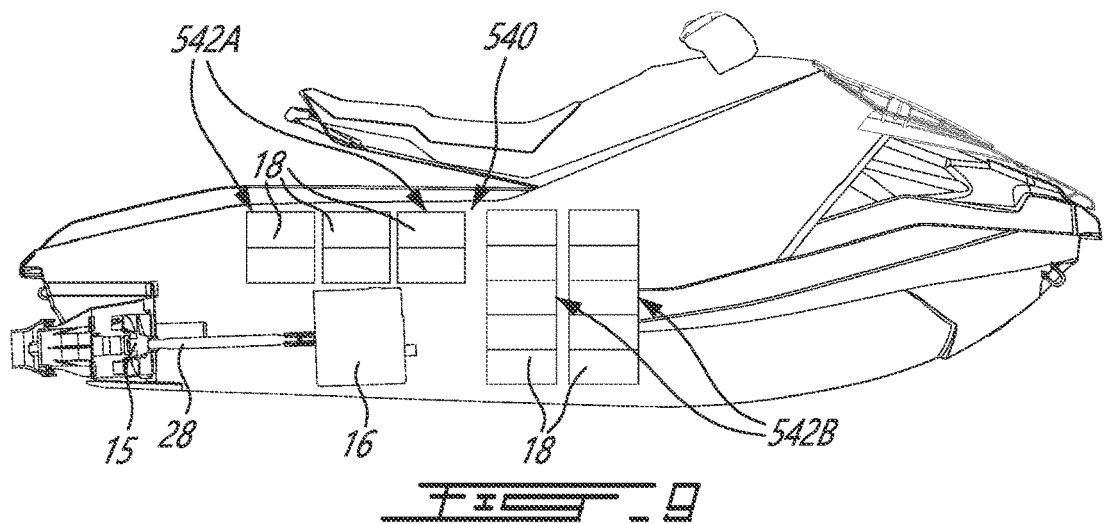
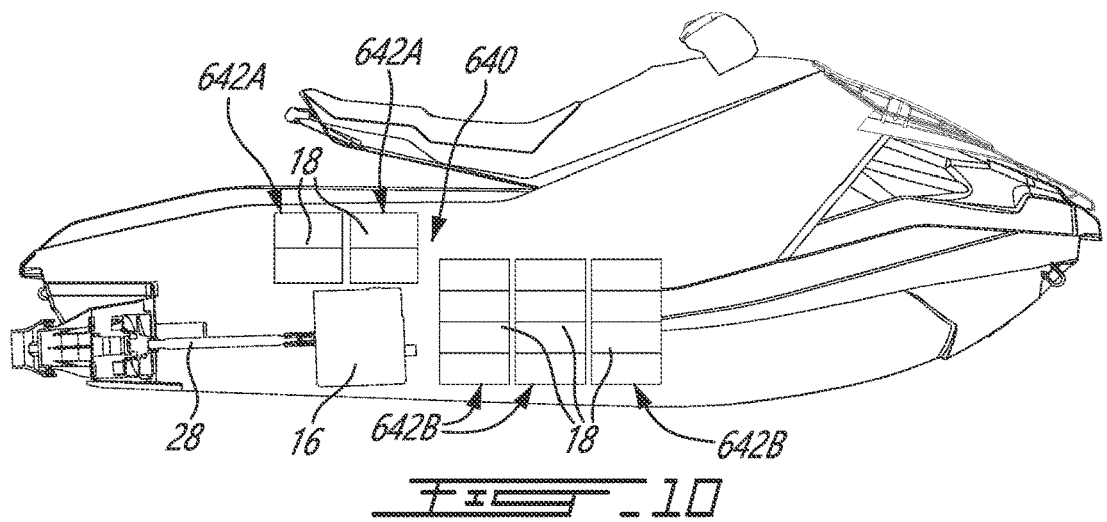

BATTERY PACK FOR PERSONAL WATERCRAFT

CROSS-REFERENCE TO RELATED APPLICATIONS

This application is a continuation of U.S. patent application Ser. No. 17/718,415 filed on Apr. 12, 2022 and incorporated herein by reference, which claims priority from U.S. Provisional Patent Application No. 63/180,358, filed Apr. 27, 2021 and incorporated herein by reference, and from U.S. Provisional Patent Application No. 63/193,836, filed May 27, 2021 and incorporated herein by reference.

TECHNICAL FIELD

The application relates generally to watercraft and, more particularly, to watercraft using an electric power source.

BACKGROUND

For watercraft, and in particular personal watercraft (PWC), components are arranged and positioned in consideration of their effect on the center of gravity (CG) of the PWC, both with and without a driver and/or passenger. In PWC which use electric power as a power source, multiple electric batteries are provided. Batteries are relatively heavy components that influence the center of gravity of the PWC and how other components of the PWC must be configured.

SUMMARY

Some embodiments of the present disclosure provide apparatus and methods for positioning one or more batteries rearward (i.e., towards the stern) of a PWC. The weight of the batteries and/or battery enclosure may position the CG of the PWC towards the stern, which may be desirable to help balance the PWC in water and offset the weight of a operator and/or a passenger on the PWC.

There is disclosed a personal watercraft, comprising: a deck and a hull defining an interior volume; an electric motor housed within the interior volume, the electric motor operable to rotate a drive shaft, the drive shaft including an internal segment within the interior volume and an external segment outside of the interior volume, the external segment in driving engagement with an impeller; and a battery pack having a battery enclosure housing one or more batteries, the battery pack positioned within the interior volume and a portion of at least one battery of the one or more batteries positioned vertically above the drive shaft.

In some embodiments, a portion of at least one battery is positioned vertically above the internal segment of the drive shaft.

In some embodiments, the hull defines a water intake in fluid communication with the impeller, a portion of at least one battery positioned vertically above than the water intake.

In some embodiments, the electric motor has a motor output shaft connected to the interior segment of the drive shaft, a portion of at least one battery positioned vertically above than the motor output shaft.

In some embodiments, a portion of at least one battery is between the impeller and the electric motor along a center axis of the personal watercraft.

In some embodiments, the battery enclosure includes an aft portion disposed rearward of the electric motor, the aft portion having a starboard sub-enclosure on a starboard side of the drive shaft and a port sub-enclosure on a port side of the drive shaft.

In some embodiments, some of the one or more batteries are housed within the starboard sub-enclosure, and some of the one or more batteries are housed within the port sub-enclosure.

In some embodiments, the battery enclosure includes an aft portion disposed rearward of the electric motor, a front portion disposed forward of the electric motor, and a bridge portion extending between the aft and front portions.

In some embodiments, the battery enclosure straddles the electric motor.

In some embodiments, the battery enclosure has a top wall, at least part of the top wall being removable to access an interior of the battery enclosure.

In some embodiments, the battery enclosure comprises a base section defining a bottom of the battery enclosure, a top section spaced apart from the base section to define an inner volume of the battery enclosure, and a middle section extending between and connecting the base and top sections.

In some embodiments, the battery enclosure comprises a base section defining a bottom of the battery enclosure and a top section mountable to the base section to define an inner volume of the battery enclosure.

There is disclosed a personal watercraft, comprising: a deck and a hull defining an interior volume; an electric motor housed within the interior volume, the electric motor operable to rotate a drive shaft mounted to an impeller; and a battery pack housed within the interior volume, the battery pack having a battery enclosure housing one or more batteries, the battery enclosure having an aft portion disposed rearward of the electric motor and a front portion disposed forward of the electric motor.

In some embodiments, the battery enclosure defines a single enclosure volume including the aft and front portions.

In some embodiments, the battery enclosure defines a first enclosure volume including the aft portion, and a second enclosure volume including the front portion, the first and second enclosure volumes being separate.

In some embodiments, some of the one or more batteries are housed within the aft portion, and some of the one or more batteries are housed within the front portion.

In some embodiments, a portion of at least one battery of the one or more batteries is positioned vertically above the drive shaft.

In some embodiments, a portion of at least one battery is between the impeller and the electric motor along a center axis of the personal watercraft.

In some embodiments, the aft portion of the battery enclosure has a starboard sub-enclosure on a starboard side of the drive shaft and a port sub-enclosure on a port side of the drive shaft.

In some embodiments, some of the one or more batteries are housed within the starboard sub-enclosure, and some of the one or more batteries are housed within the port sub-enclosure.

In some embodiments, the battery enclosure includes a bridge portion extending between the aft and front portions.

In some embodiments, the battery enclosure has a top wall, at least part of the top wall being removable to access an interior of the battery enclosure.

In some embodiments, the battery enclosure comprises a base section defining a bottom of the battery enclosure, a top section spaced apart from the base section to define an inner volume of the battery enclosure, and a middle section extending between and connecting the base and top sections.

In some embodiments, the battery enclosure comprises a base section defining a bottom of the battery enclosure and a top section mountable to the base section to define an inner volume of the battery enclosure.

There is disclosed a personal watercraft, comprising: a deck and a hull defining an interior volume; a battery pack housed within the interior volume, the battery pack having a battery enclosure housing one or more batteries, the battery enclosure defining a passage; and an electric motor housed within the interior volume, the electric motor operable to rotate a drive shaft mounted to an impeller, part of the drive shaft extending through the passage.

In some embodiments, the hull comprises an intake opening, the drive shaft extending through the intake opening.

In some embodiments, the battery enclosure has walls delimiting the passage outside of the battery enclosure.

In some embodiments, wherein the battery enclosure includes an aft portion disposed rearward of the electric motor, the passage defined in the aft portion.

In some embodiments, the passage defines a passage length, all of the passage length disposed rearward of the electric motor.

In some embodiments, a portion of at least one battery of the one or more batteries is positioned vertically above the drive shaft.

In some embodiments, the battery enclosure has an aft portion disposed rearward of the electric motor and a front portion disposed in front of the electric motor.

In some embodiments, the battery enclosure defines a single enclosure volume including the aft and front portions.

In some embodiments, a portion of at least one battery of the one or more batteries is positioned between the impeller and the electric motor along a center axis of the personal watercraft.

In some embodiments, the battery enclosure includes an aft portion disposed rearward of the electric motor, the aft portion having a starboard sub-enclosure on a starboard side of the drive shaft and a port sub-enclosure on a port side of the drive shaft.

In some embodiments, some of the one or more batteries are housed within the starboard sub-enclosure, and some of the one or more batteries are housed within the port sub-enclosure.

In some embodiments, the battery enclosure includes an aft portion disposed rearward of the electric motor, a front portion disposed in front of the electric motor, and a bridge portion extending between the aft and front portions.

In some embodiments, the battery enclosure has a top wall, at least part of the top wall being removable to access an interior of the battery enclosure.

In some embodiments, the battery enclosure comprises a base section defining a bottom of the battery enclosure, a top section spaced apart from the base section to define an inner volume of the battery enclosure, and a middle section extending between and connecting the base and top sections.

In some embodiments, the battery enclosure comprises a base section defining a bottom of the battery enclosure and a top section mountable to the base section to define an inner volume of the battery enclosure.

There is disclosed a personal watercraft battery enclosure, comprising: a base section defining a bottom of the battery enclosure to receive one or more batteries thereon, a top section spaced apart from the base section to define an inner volume of the battery enclosure, and a middle section extending between and connecting the base and top sections, the base, top and middle sections sealing the inner volume upon being connected.

In some embodiments, the base section defines a longitudinal center axis and a vertical plane extending through the longitudinal center axis, the base section having external side walls being upright and inclined toward the vertical plane.

In some embodiments, the base section has an aft portion spaced apart from a front portion along the longitudinal center axis, the external side walls forming part of the aft portion.

In some embodiments, the base section has internal side walls positioned closer to the longitudinal center axis than the external side walls, the internal side walls being upright and inclined toward the vertical plane.

In some embodiments, the battery enclosure defines a single enclosure volume including the aft and front portions.

In some embodiments, the battery enclosure defines a first enclosure volume including the aft portion, and a second enclosure volume including the front portion, the first and second enclosure volumes being separate.

In some embodiments, the aft portion has a starboard sub-enclosure on a starboard side of the battery enclosure and a port sub-enclosure on a port side of the battery enclosure.

In some embodiments, the battery enclosure comprises a bridge portion extending between the aft and front portions.

In some embodiments, the battery enclosure comprises one or more batteries received on the base section.

In some embodiments, the base section defines a passage extending therethrough.

There is disclosed a method of configuring a personal watercraft, the method comprising: positioning a battery enclosure for housing one or more batteries within a hull of the personal watercraft to locate at least one battery of the one or more batteries vertically higher than a drive shaft of the personal watercraft.

There is disclosed a method of configuring a personal watercraft, the method comprising: positioning a battery enclosure for housing one or more batteries within a hull of the personal watercraft to locate an aft portion of the battery enclosure rearward of an electric motor of the personal watercraft, and to locate a front portion of the battery enclosure in front of the electric motor.

There is disclosed a method of configuring a personal watercraft, the method comprising: positioning a drive shaft of the personal watercraft to extend through a passage of a battery enclosure of the personal watercraft.

There is disclosed a method of configuring a personal watercraft, the method comprising: positioning a battery enclosure for housing one or more batteries within a hull of the personal watercraft, including: positioning a top section of the battery enclosure apart from a base section of the battery enclosure to define an inner volume of the battery enclosure; and connecting a middle section to the base and top sections to seal the inner volume.

DESCRIPTION OF THE DRAWINGS

Reference is now made to the accompanying figures in which:

FIG. 2A is a cross-sectional view of the watercraft of FIG. 1, showing a configuration of a battery pack;

FIG. 2B is top view of the watercraft of FIG. 1 showing the battery pack of FIG. 2A;

FIG. 2C is a cross-sectional view of part of FIG. 2B;

FIG. 3 is a cross-sectional view of the watercraft of FIG. 1, showing another configuration of the battery pack;

FIG. 4 is a cross-sectional view of the watercraft of FIG. 1, showing yet another configuration of the battery pack;

FIG. 7 is a top view of part of the battery enclosure of FIG. 5A;

FIG. 8 is a cross-sectional view of the watercraft of FIG. 1, showing yet another configuration of the battery pack;

FIG. 9 is a cross-sectional view of the watercraft of FIG. 1, showing yet another configuration of the battery pack; and FIG. 10 is a cross-sectional view of the watercraft of FIG. 1, showing yet another configuration of the battery pack.

DETAILED DESCRIPTION

The following disclosure relates to electric watercraft, electric battery enclosures and methods for positioning electric battery modules and electric battery enclosures within an electric watercraft. Examples of suitable electric watercraft include personal watercraft (PWCs) having a straddle seat for accommodating an operator and optionally one or more passengers.

Figure 1:
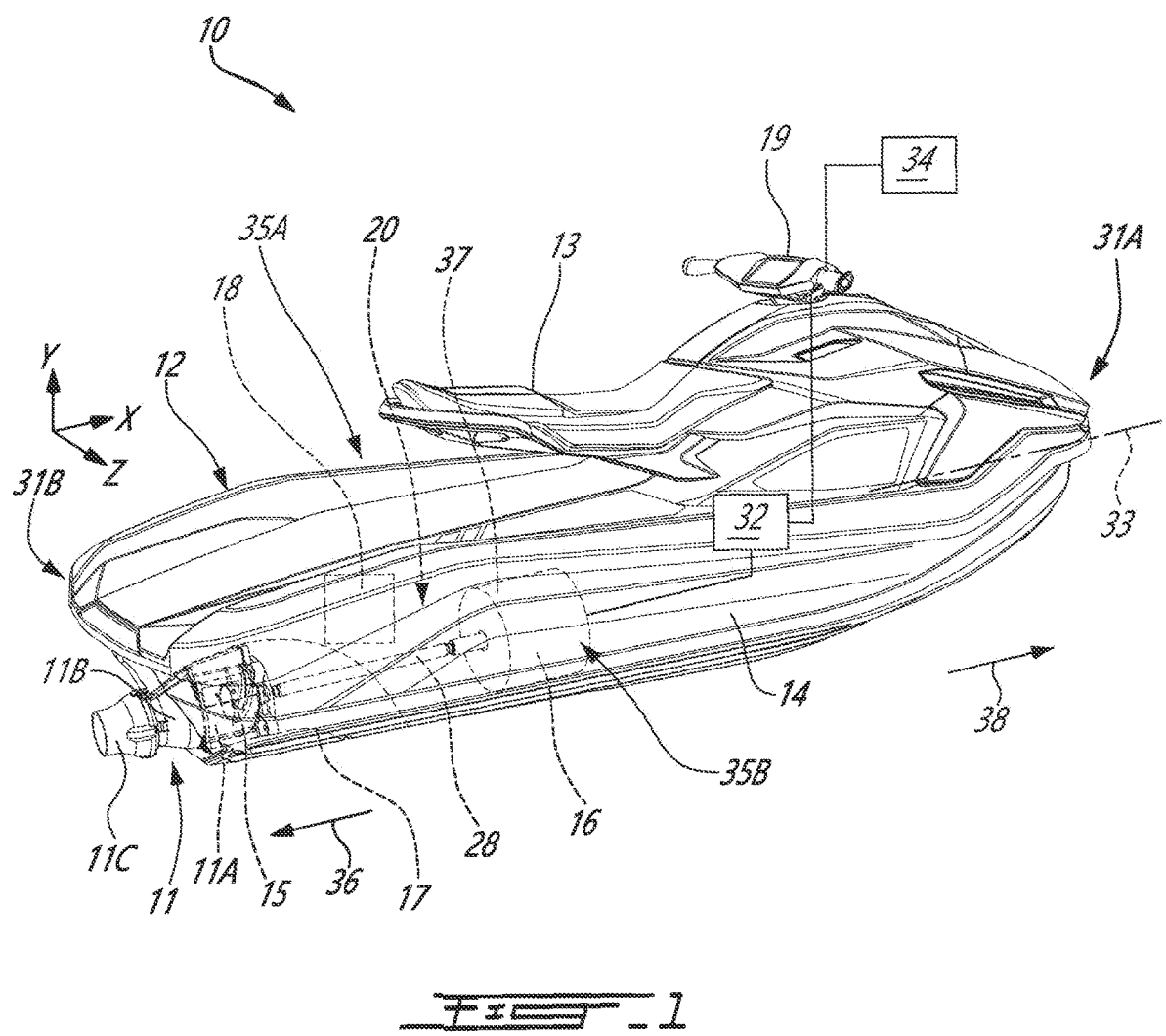
FIG. 1 is a perspective view of a watercraft.

FIG. 1 illustrates a watercraft 10 of a type preferably used for transporting one or more passengers over a body of water. The watercraft 10 is therefore sometimes referred to herein as a "personal watercraft 10" or "PWC 10". The PWC 10 of FIG. 1 is electrically powered. An upper portion of the PWC 10 is formed of a deck 12 including a straddle seat 13 for accommodating a driver of the PWC 10 and optionally one or more passengers. A lower portion of the PWC 10 is formed of a hull 14 which sits in the water. The hull 14 and the deck 12 enclose an interior volume 37 of the PWC 10 which provides buoyancy to the PCW 10 and houses components thereof. A non-limiting list of components of the PWC 10 that may be located in the interior volume 37 include an electric motor 16, one or more electric batteries 18, a thermal management system, and other components for an electric drive system 20 of the PWC 10. The hull 14 may also include strakes and chines which provide, at least in part, riding and handling characteristics of the PWC 10. The interior volume 37 may also include any other components suitable for use with PWC 10, such as storage compartments, for example.

The PWC 10 includes a jet propulsion system 11 to create a pressurized jet of water which provides thrust to propel the PWC 10 through the water. The jet propulsion system 11 includes an impeller 15 disposed in the water to draw water through a water intake 17 on an underside of the hull 14, with the water being directed to a jet pump 11A. Water ejected from the jet pump 11A is directed through a venturi 11B which further accelerates the water to provide additional thrust. The accelerated water jet is ejected from the venturi 11B via a pivoting steering nozzle 11C which is directionally controlled by the driver with a steering mechanism 19 to provide a directionally controlled jet of water to propel and steer the PWC 10.

The electric drive system 20 of the PWC 10 includes one or more of the electric motors 16 (referred hereinafter in the singular) drivingly coupled to the impeller 15 via a drive shaft 28. The drive shaft 28 transfers motive power from the electric motor 16 to the impeller 15. The electric drive system 20 also includes the batteries 18 (referred hereinafter in the singular) for providing electric current to the electric motor 16 and driving the electric motor 16. The operation of the electric motor 16 and the delivery of drive current to the electric motor 16 may be controlled by a controller 32 based on an actuation by the driver of an accelerator 34, sometimes referred to as a "throttle", on the steering mechanism 19, among other inputs. In some embodiments, the battery 18 may be a lithium ion or other type of battery 18. In various embodiments, the electric motor 16 may be a permanent magnet synchronous motor or a brushless direct current motor for example.

Referring to FIG. 1, the PWC 10 moves along a rear or aft direction of travel 36 and along a forward direction of travel 38. The forward direction of travel 38 is the direction along which the PWC 10 travels in most instances when displacing. The aft direction of travel 36 is the direction along which the PWC 10 displaces only occasionally, such as when it is reversing. The PWC 10 includes a bow 31A and a stern 31B defined with respect to the aft and forward directions of the travel 36,38, in that the bow 31A is positioned ahead of the stern 31B relative to the forward direction of travel 38, and that the stern 31B is positioned astern of the bow 31A relative to the aft direction of travel 36. The PWC 10 defines a longitudinal center axis 33 that extends between the bow 31A and the stern 31B. A port side 35A and a starboard side 35B of the PWC 10 are defined on opposite lateral sides of the center axis 33. The positional descriptors "front", "aft" and "rear" and terms related thereto are used in the present disclosure to describe the relative position of components of the PWC 10. For example, if a first component of the PWC 10 is described herein as being in front of, or forward of, a second component, the first component is closer to the bow 31A than the second component. Similarly, if a first component of the PWC 10 is described herein as being aft of, or rearward of, a second component, the first component is closer to the stern 31B than the second component. The PWC 10 also includes a three-axes frame of reference that is displaceable with the PWC 10, where the Y-axis is parallel to the vertical direction, the X axis is parallel to the center axis 33, and the Z-axis is perpendicular to both the X and Y axes and defines a lateral direction between the port and starboard sides 35A,35B. Features and components are described and shown in the present disclosure in relation to the PWC 10, but the present disclosure may also be applied to different types of watercraft 10, such as other boats or other vessels, used to transport people and/or cargo.

Referring to FIGS. 2A to 2C, the hull 14 is an elongated body that extends along the center axis 33 and is symmetrical about a vertical plane extending through the center axis 33. Positioned within the interior volume 37 is the electric motor 16. The electric motor 16 may be housed in a motor compartment that is sealed from a remainder of the interior volume 37 to prevent the ingress of water or other fluids into the motor compartment. The electric motor 16 in operation rotates the drive shaft 28 and the impeller 15 about a drive shaft axis 28A. Referring to FIG. 2A, part of the drive shaft 28, referred to herein as an internal segment 28B of the drive shaft 28, which is positioned in the interior volume 37. The remainder of the drive shaft 28, referred to herein as an external segment 28C of the drive shaft 28, is located, along with the impeller 15, outside of the interior volume 37. The external segment 28C may be mounted to the impeller 15 using any suitable mechanical interface or fastening arrangement, or may be integral with the impeller 15. Although shown in FIG. 2A as being outside of the hull 14, the external segment 28C and the impeller 15 are still within the overall footprint or area occupied by the hull 14, such that the external segment 28C and the impeller 15 are not visible when viewing the hull 14 from above (as shown in FIG. 2B). The drive shaft 28 extends in an aft or rearward direction from the electric motor 16, and the impeller 15 is located at an aft end, or at the stern 31B, of the PWC 10.

Referring to FIGS. 2A to 2C, the PWC 10 has a battery pack 40 that is positioned within the interior volume 37 defined by the hull 14 and deck 12 when assembled. The battery pack 40 includes a battery enclosure 42 which houses or contains the batteries 18 or battery modules. The terms "batteries" and "battery modules" will be used interchangeably within the description. The batteries or battery modules 18 may include a plurality of battery pouches, frame elements and/or thermal management elements, among other components. Suitable batteries or battery modules 18 are described in U.S. patent application Ser. No. 17/091,777 entitled "Battery cooling panel for electric vehicles", the entirety of which is incorporated by reference herein. The batteries 18 may be vertically stacked, horizontally aligned or positioned in any other configuration or orientation within the battery enclosure 42 to achieve the desired energy density for the battery pack 40.

Referring to FIGS. 2A and 2C, one or more of the batteries 18, or a portion of one or more of the batteries 18, is positioned within the interior volume 37 such that it is located above the drive shaft 28. One or more of the batteries 18, or a portion of one or more of the batteries 18, is positioned within the interior volume 37 such that its position along the Y-axis of the frame of reference of the PWC 10 is greater than the position of the drive shaft 28 along the Y-axis. One or more of the batteries 18, or a portion of one or more of the batteries 18, is positioned within the interior volume 37 such that its position is vertically higher and/or above the position of the drive shaft axis 28A.

The expression "vertically higher and/or above the position of the drive shaft axis 28A" refers to one or more of the batteries 18, or a portion of one or more of the batteries 18, having a position within the interior volume 37 that is vertically higher than a horizontal plane that extends through the drive shaft axis 28A. In this vertically higher position, the one or more batteries 18, or the portion of one or more of the batteries 18, may be laterally offset from a vertical plane extending through the drive shaft axis 28A such that the batteries 18 do not vertically overlap the drive shaft 28. Alternatively, in this vertically higher position, the one or more batteries 18, or the portion of one or more of the batteries 18, may be inclined towards or intersect the vertical plane so as to vertically overlap the drive shaft 28.

Referring to FIGS. 2B and 2C, a portion of the batteries 18 are positioned above the drive shaft axis 28A such that they vertically overlap the drive shaft axis 28A along the Y axis. While being positioned above the drive shaft 28, the one or more batteries 18, or a portion of one or more of the batteries 18, may be laterally offset relative to the drive shaft 28 toward one or both of the port and starboard sides 35A,35B along the Z axis. At least a portion of some of the batteries 18 in the configuration of the battery pack 40 shown in FIGS. 2A to 2C thus overlap, in a vertical direction, the drive shaft 28 connecting the electric motor 16 to the impeller 15. One or more of the batteries 18 and at least part of the battery enclosure 42 extends over the drive shaft 18. Having at least some of the batteries 18 overlap the drive shaft 28 in the vertical direction may provide flexibility in optimising battery packaging and weight distribution, and allows for flexibly positioning other heavy components within the hull 14. For example, these other heavy components may be positioned at, or closer to, their optimal position.

When looking at the rear of hull 14 (i.e. in proximity to the stern 31B), and referring to FIGS. 2B and 2C, at least some of the batteries 18 are positioned relative to the center axis 33, or at least the vertical plane extending through the center axis 33, between the motor 16 and the upright wall of the hull 14 at, or defining, the stern 31B. Referring to FIG. 2C, some of the battery enclosure 42 is positioned relative to the center axis 33, or the vertical plane extending through the center axis 33, between the motor 16 and the upright wall of the hull 14 at, or defining, the stern 31B.

Different configurations of the batteries 18 overlapping the drive shaft 28 are possible and within the scope of the present disclosure.

In one possible configuration, and referring to FIGS. 2A to 2C, multiple batteries 18 are positioned above the internal segment 28B of the drive shaft 28. Referring to FIGS. 2A to 2C, none of the batteries 18 are above the external segment 28C of the drive shaft 28. In an alternate embodiment, one or more of the batteries 18 are located within the battery enclosure 42 above some of the external segment 28C as well, so as to position one or more batteries 18 rearward or astern within the hull 14.

In another possible configuration, and referring to FIGS. 2A to 2C, one or more of the batteries 18 are positioned above the water intake 17 defined in the hull 14 which conveys water to the impeller 15. Referring to FIG. 2A, the water intake 17 is a fluid conduit extending through the hull 14 from an inlet 17A to an outlet 17B. The inlet 17A includes an opening in a bottom wall of the hull 14 for admitting water into the water intake 17. The inlet 17A may include a mesh or screen 17C covering the opening to prevent the ingress of debris and for safety purposes. The water intake 17 extends rearward or aft from the inlet 17A to the outlet 17B. The outlet 17B includes an opening (sometimes referred to as the "tunnel") in the hull 14 at, or about, which the venturi 11B is positioned. The impeller 15 is positioned within the opening defined by the outlet 17B. The inlet 17A is forward of the outlet 17B. The outlet 17B is at the aft end of the PWC 10, or its stern 31B. Referring to FIG. 2A, multiple batteries 18 are positioned within the interior volume 37 at a location that is vertically higher than an upper surface of the walls defining the water intake 17. Multiple batteries 18 are positioned within the interior volume 37 at a location that is vertically higher than the inlet 17A of the water intake 17. Multiple batteries 18 are positioned within the interior volume 37 at a location that is vertically above the water intake 17 along all of its length from the inlet 17A to the outlet 17B.

Referring to FIG. 2A, the hull 14 includes an intake opening 14A. The intake opening 14A is a hole or through-passage defined in the hull 14. The hole of the intake opening 14A has a center axis that may be collinear with drive shaft axis 28A. The drive shaft 28 extends through the hull 14 at the intake opening 14A and into the water intake 17. The intake opening 14A divides the drive shaft 28 into the internal and external segments 28B,28C, such that the portion of the drive shaft 28 that is forward of the intake opening 14A is the internal segment 28B, and such that the portion of the drive shaft 28 that is aft of the intake opening 14A is the external segment 28C. Suitable bearings and sealing may be applied between the walls defining the intake opening 14A and the drive shaft 28, to prevent water and debris from entering the interior volume 37 via the intake opening 14A.

In yet another possible configuration of the batteries 18 overlapping the drive shaft 28, and referring to FIG. 2A, one or more of the batteries 18 are positioned above a motor output shaft 16A of the electric motor 16. The motor output shaft 16A is a rotatable output of the electric motor 16 that is connected to the internal segment 28B of the drive shaft 28 so as to transmit rotational drive to the drive shaft 28. The motor output shaft 16A is rotatable about the drive shaft axis 28A. In the configuration shown in FIG. 2A, multiple batteries 18 are positioned within the internal volume 37 such that at least a portion of the batteries 18 are positioned at a location that is vertically higher, and/or above the motor output shaft 16A. More specifically, a portion of the batteries 18 are positioned above the motor output shaft 16A such that they vertically overlap the motor output shaft 16A along the Y axis.

The batteries 18 may also be axially positioned (i.e. defined relative to the center axis 33 or along the X axis) with respect to components within the internal volume 37. Referring to FIG. 2A, multiple batteries 18 are located between the impeller 15 and the electric motor 16. Multiple batteries 18 are located between the impeller 15 and the electric motor 16 and above the drive shaft 28. Referring to FIG. 2A, multiple batteries 18 are positioned forward of the impeller 15 and aft of the electric motor 16. Multiple batteries 18 are positioned closer to the bow 31A than the impeller 15, and are positioned closer to the stern 31B than the electric motor 16. Portions of the battery enclosure 42 are positioned forward of the impeller 15 and aft of the electric motor 16.

This axial positioning along the center axis 33 of some of the batteries 18 places them between the electric motor 16 and the jet pump 11A. Since batteries 18 are relatively heavy components, axially positioning at least some of the batteries 18 aft of the electric motor 16 may help locate the center of gravity CG more toward the stern 31B. For some PWC 10, it may be beneficial to locate the center of gravity CG closer toward the stern 31B than the bow 31A. Having such a "rearward" CG helps to compensate for the weight of the driver and/or passenger of the PWC 10, which are positioned axially along the center axis 33 closer to the bow 31A and often leaning toward the bow 31A when using the PWC 10. Having such a "rearward" CG may also help with maintaining the stability of the PWC 10 when it is being towed by another vessel. The axial positioning of some of the batteries 18 between the electric motor 16 and the jet pump 11A may also help to centralize some of the heaviest components of the hull 14 for improvement of the position of the CG (e.g., CG optimization), while also using the interior volume 37 efficiently. Although the CG is shown in FIG. 2A as a point in the three-axes frame of reference of the PWC 10, it will be appreciated that the CG may also be a range of acceptable positions along the X, Y and/or Z axes. The axial positioning along the center axis 33 of some of the batteries 18 between the electric motor 16 and the jet pump 11A may also contribute to reducing the axial length of the drive shaft 28. In some conventional watercraft, batteries are placed in front of the motor which, considering their relatively large weight, can create CG issues particularly when the driver is leaning forward on the watercraft.

Referring to FIGS. 2A to 2C, the battery enclosure 42 has an aft portion 44A disposed rearward of the electric motor 16 and a front portion 44B disposed in front of the electric motor 16. The aft portion 44A is disposed closer to the stern 31B than the front portion 44B, and the front portion 44B is disposed closer to the bow 31A than the aft portion 44A. In the configuration of the battery pack 40 shown in FIGS. 2A to 2C, multiple batteries 18 are located in each of the aft and front portions 44A,44B. In the configuration of the battery pack 40 shown in FIGS. 2A to 2C, the battery enclosure 42 defines or delimits a single enclosure volume that includes the aft and front portions 44A,44B. The aft and front portions 44A,44B are spaced apart from each other along the center axis 33, and are interconnected by a bridge portion 44C of the battery enclosure 42. The aft, front and bridge portions 44A,44B,44C of the battery enclosure 42 define a battery enclosure volume 44E which is a volume of air or gas that is separate from, and sealed off from, the interior volume 37. The battery enclosure volume 44E is a single or integral three-dimensional space defined by the internal walls of the aft, front and bridge portions 44A,44B,44C. Air or gas is thus free to circulate between the aft, front and bridge portions 44A,44B,44C and is prevented from escaping the battery enclosure 42 into the interior volume 37. The aft, front and bridge portions 44A,44B,44C thus define a single housing or cavity for the battery modules 18 which are both forward and rearward of the electric motor 16.

The battery enclosure 42 is able to house battery modules 18 both forward of the electric motor 16 and rearward of the electric motor 16, which allows some battery modules 18 to be positioned in between the electric motor 16 and the jet pump 11A so as to possibly provide the benefits of the "rearward" CG described above. Referring to FIG. 2A, at least a portion of the batteries 18 in the aft portion 44A are above the drive shaft 28. Also positioning some of the batteries 18 forward of the electric motor 16 may contribute to reducing the length of the drive shaft 28. In an alternate embodiment, only the aft portion 44A of the battery enclosure 42 houses batteries 18 and the front portion 44B contains no batteries 18.

In an alternate embodiment, the aft and front portions 44A,44B each define their own enclosure volumes which are separate from each other and not fluidly connected. In such an embodiment, the aft and front portions 44A,44B define separately, sealed-off volumes, such that the batteries 18 are in separate aft and forward portions 44A,44B of the battery enclosure 42. The PWC 10 thus has a first battery enclosure (i.e. defined by the aft portion 44A) that is positioned rearward of the electric motor 16, and a second battery enclosure (i.e. defined by the front portion 44B) that is positioned forward of the electric motor 16.

Referring to FIGS. 2B and 2C, the aft portion 44A has a starboard sub-enclosure 46A and a port sub-enclosure 46B. The starboard and port sub-enclosures 46A,46B are regions of the aft portion 44A that are located on opposite lateral sides of the center axis 33. The starboard sub-enclosure 46A faces toward the starboard side 35B of the PWC 10, and is positioned closer toward the starboard side 35B than the port sub-enclosure 46B. The port sub-enclosure 46B faces toward the port side 35A of the PWC 10, and is positioned closer toward the port side 35A than the starboard sub-enclosure 46A. The starboard and port sub-enclosures 46A, 46B are at least partially disposed on opposite lateral sides of the drive shaft 28. The starboard and port sub-enclosures 46A,46B straddle the drive shaft 28 and straddle the water intake 17, meaning that they extend vertically above and laterally surround the drive shaft 28 and the water intake 17. At least a portion of the starboard sub-enclosure 46A is located towards the starboard side 35B relative to the drive shaft 28 and the water intake 17 and at least a portion of the starboard sub-enclosure 46A is located vertically above the drive shaft 28. At least a portion of the port sub-enclosure 46B is located towards the port side 35A relative to the drive shaft 28 and the water intake 17 and at least a portion of the port sub-enclosure 46B is located vertically above the drive shaft 28. In the configuration of the battery pack 40 shown in FIGS. 2B and 2C, each of the starboard and port sub-enclosures 46A,46B house or contain multiple batteries 18. In an alternate embodiment, only one of the starboard and port sub-enclosures 46A,46B include batteries 18. The aft portion 44A is thus a portion of the battery enclosure 42 that straddles the drive shaft 28 and the water intake 17. The front portion 44B of the battery enclosure 42 may also have starboard and port sub-enclosures 46A,46B.

Referring to FIGS. 2B and 2C, the battery enclosure 42 straddles the motor 16. In the depicted embodiment, the bridge portion 44C of the battery enclosure 42 overlies or overlaps the motor 16, such that the bridge portion 44C is positioned vertically higher and/or above the motor 16 along the Y axis. The aft and front portions 44A,44B of the battery enclosure 42 straddle the motor 16, meaning that the aft and front portions 44A,44B have features that extend vertically above and laterally surround the motor 16 on opposite sides of the center axis 33.

Referring to FIG. 2B, the battery enclosure 42 has a top wall 48A. Some or all of the top wall 48A can be removed to access the battery enclosure volume 44E. The top wall 48A may be completely removable, or may have an opening which is closeable with an access panel. The removability of some or all of the top wall 48A allows for accessing components of the electric drive system 20, such as the batteries 18. To obtain access to the motor 16, the entire battery enclosure 42 may need to be removed.

Referring to FIGS. 2B to 2C, the battery enclosure 42 defines or delimits a passage 41. The passage 41 is a through passage which extends through some or all of the battery enclosure 42. In the configuration of the battery pack 40 shown in FIGS. 2B to 2C, the passage 41 is exterior to the battery enclosure 42. The passage 41 is separate from the battery enclosure volume 44E. The passage 41 is part of the interior volume 37 of the PWC 10. The battery enclosure 42 has external walls 43A which delimit the passage 41 so as to position it outside of the battery enclosure 42. In an alternate embodiment, the passage 41 extends through the battery enclosure 42, and extends through the battery enclosure volume 44E, and is suitably sealed off therefrom. In the configuration of the battery pack 40 shown in FIGS. 2A to 2B, the passage 41 extends within the interior volume 37 in a longitudinal direction that is parallel to the center axis 33. The passage 41 extends within the hull 14 in a longitudinal direction that is parallel to the port and starboard sides 35A,35B. The passage 41 extends within the hull 14 in a fore-aft direction. The passage 41 extends from an aft end of the battery enclosure 42 in the forward direction to a middle part of the battery enclosure 42, such as the bridge portion 44C.

Referring to FIG. 2A, part of the drive shaft 28, such as the internal segment 28B, extends through the passage 41. The configuration of the battery pack 40 shown in FIGS. 2A to 2C includes a battery enclosure 42 that defines a pass through passage 41 for the drive shaft 28. This allows the batteries 18 within the battery enclosure 42 to be mounted at a non-zero angle with respect to a vertical plane, as explained in greater detail below, which may help to accommodate them within the interior volume 37. Extending some of the drive shaft 28 through part of the battery enclosure 42 may also help to shorten the length of the drive shaft 28. Extending some of the drive shaft 28 through part of the battery enclosure 42 may also or instead help balance the weight of the aft portion 44A of the battery enclosure 42 about the central axis 33.

In the configuration of the battery pack 40 shown in FIGS. 2A to 2C, the entire length of the passage 41 is within the aft portion 44A of the battery enclosure 42. Referring to FIGS. 2B and 2C, the passage 41 is only present in the aft portion 44A. The passage 41 extends through all of the aft portion 44A. The passage 41 is defined between, and by, the starboard and port sub-enclosures 46A,46B of the aft portion 44A. The passage 41 defines a passage length along the center axis 33, and all of the passage length is rearward of the electric motor 16. Thus, the portion of the battery enclosure 42 that is positioned between the electric motor 16 and the jet pump 11A defines the passage 41 or cut-out to accommodate the drive shaft 28. In an embodiment, the passage 41 also has a segment that extends through some or all of the front portion 44B, but the drive shaft 28 is not present in that segment of the passage 41.

Another possible configuration of the battery pack 140 is shown in FIG. 3.

The description, function, attributes and benefits of the features of FIGS. 1 to 2C provided above apply mutatis mutandis to the same features shown in FIG. 3. The battery enclosure 142 of the battery pack 140 includes only one portion that is aft of the electric motor 16. All of the batteries 18 are thus housed within the single battery enclosure 142 and axially positioned between the electric motor 16 and the impeller 15. Most of the vertical height of each of the batteries 18 and most of the battery enclosure 142 are positioned above the drive shaft 28. The battery enclosure 142 includes or defines a passage 141 through which the drive shaft 28 extends, such that the battery enclosure 142 and the batteries 18 straddle the drive shaft 28.

Another possible configuration of the battery pack 240 is shown in FIG. 4.

The description, function, attributes and benefits of the features of FIGS. 1 to 3 provided above apply mutatis mutandis to the same features shown in FIG. 4. The battery enclosure 242 of the battery pack 240 includes an aft portion 244A that is partially aft of the electric motor 16, and which is positioned vertically above the electric motor 16. The battery enclosure 242 also includes a front portion 244B positioned in front of the electric motor 16. Some of the batteries 18 in the aft portion 244A are axially positioned between the electric motor 16 and the impeller 15, some of the batteries 18 in the aft portion 244A are axially positioned in front of the electric motor 16, and some of the batteries 18 in the aft portion 244A are axially positioned in line with the electric motor 16. All of the batteries 18 and all of the aft portion 244A of the battery enclosure 242 are positioned above the drive shaft 28. This configuration of the battery enclosure 242 may help to decrease the length of the drive shaft 28.

Figure 5A:
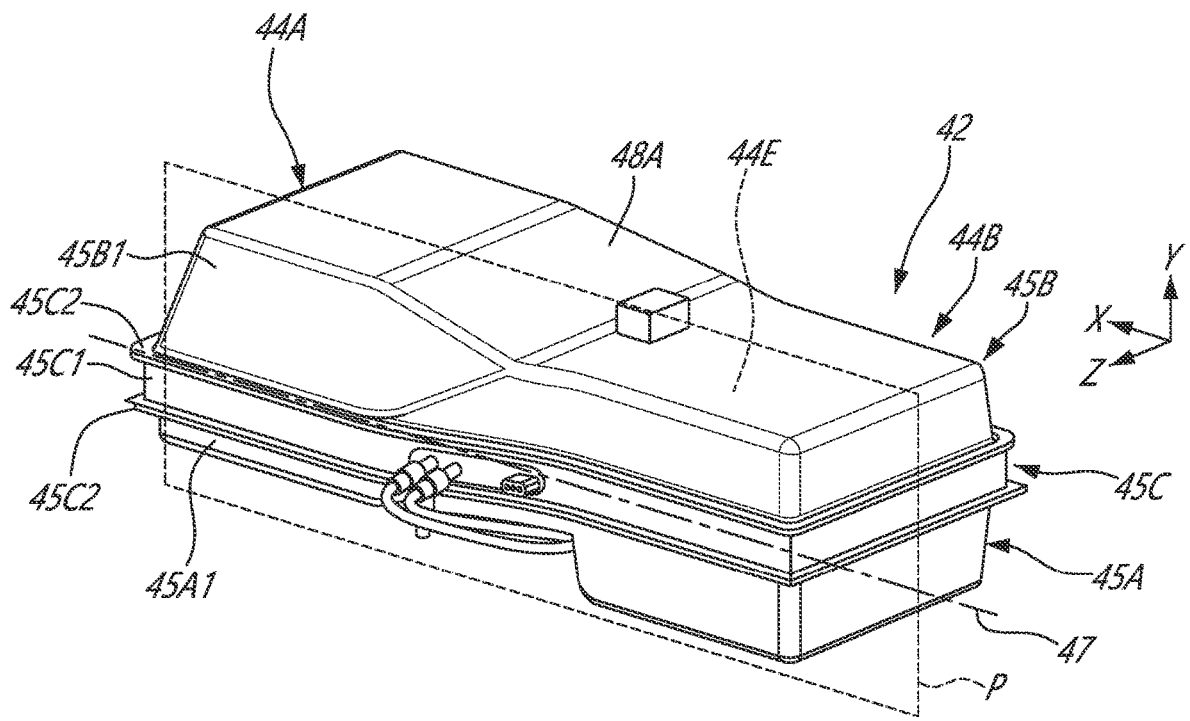
FIG. 5A is a perspective view of a battery enclosure of the battery pack.

Referring to FIG. 5A, in one example, the battery enclosure 42 is composed of three sections. The battery enclosure 42 includes a base section 45A, a top section 45B and a middle section 45C. The base section 45A defines the bottom of the battery enclosure 42 and is positioned closest to the bottom of the hull 14. The base section 45A may be a load-bearing or structural component which directly supports the weight of the batteries 18 thereon. The top section 45B is vertically spaced apart from the base section 45A so as to define the battery enclosure volume 44E of the battery enclosure 42. The middle section 45C vertically extends between the base and top sections 45A,45B, and forms a connection which structurally links the base and top sections 45A,45B. The middle section 45C is a peripheral component which extends around, and defines, part of the periphery of the battery enclosure 42. Once the base, top and middle sections 45A,45B,45C are connected together, a seal is formed or defined which may prevent the ingress of water into the battery enclosure volume 44E.

Figure 5B:
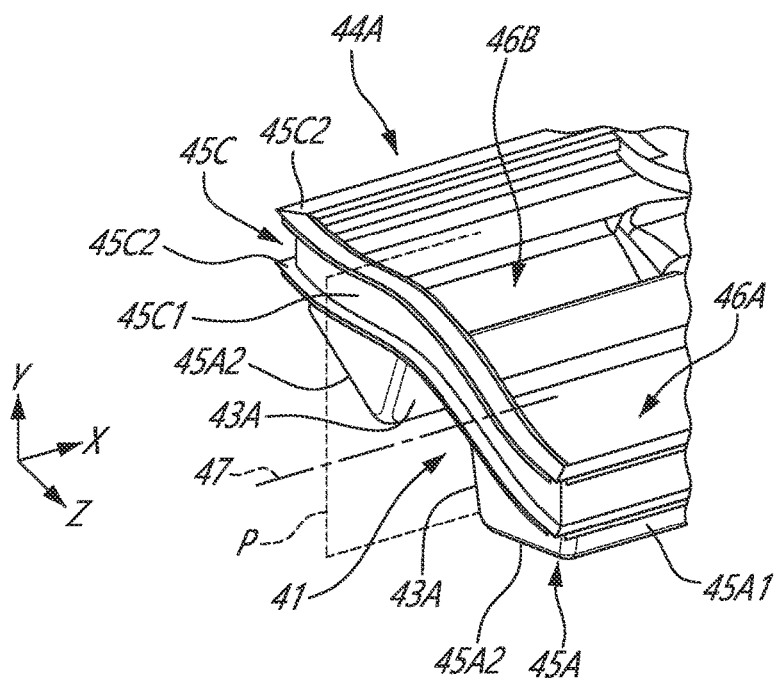
FIG. 5B is a perspective view of a base portion and a middle portion of the battery enclosure of FIG. 5A.
Figure 5C:
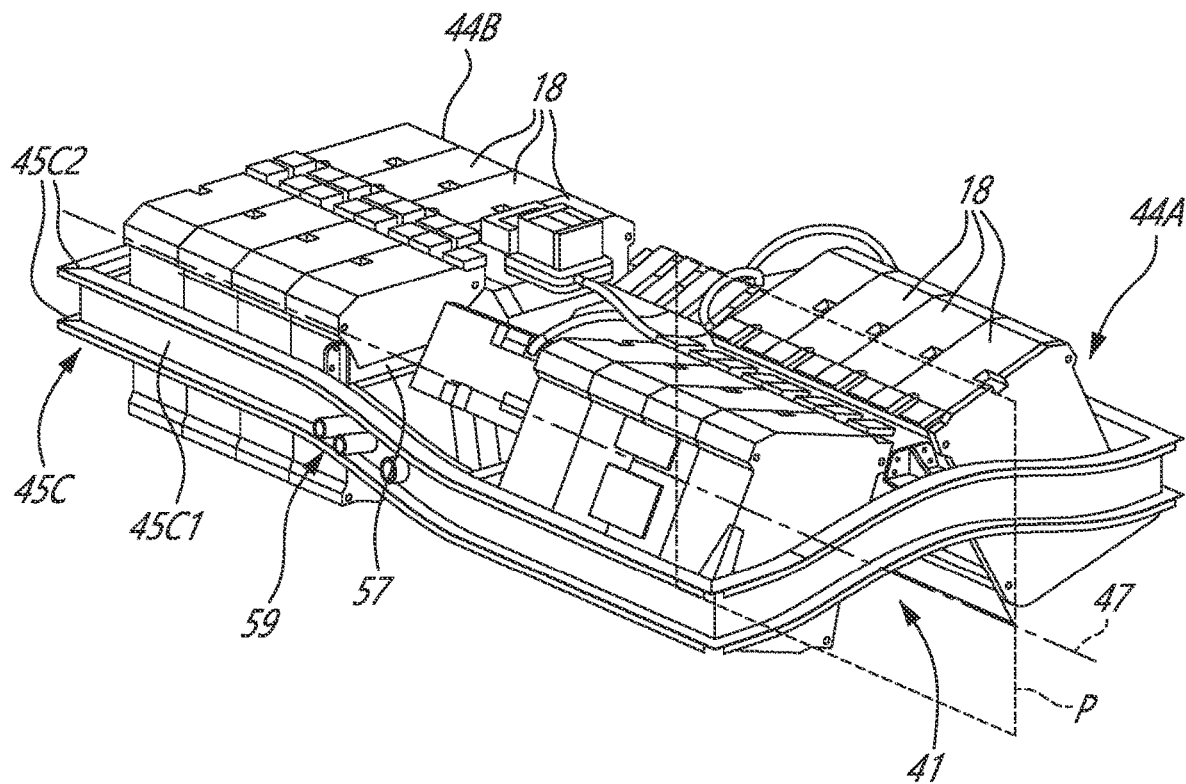
FIG. 5C is a perspective view of the battery enclosure of FIG. 5A with batteries.

Referring to FIGS. 5B and 5C, the middle section 45C is a frame element that goes all the way around the battery modules 18 to retain them together, thereby supporting the loads of the batteries 18. The middle section 45C may thus help support the weight of the batteries 18. The top section 45B and the base section 45A are covers which provide a sealing functionality and which are attached to the structural frame of the middle section 45C. In such a configuration, the battery enclosure 42 has at least the following sealing interfaces: a first sealing interface between the middle section 45C and the base section 45A, and a second sealing interface between the middle section 45C and the top section 45B. The middle section 45C includes an upright wall 45C1 that defines the middle part of the periphery of the battery enclosure 42, and mating flanges 45C2 vertically spaced apart by the upright wall 45C1 and which mate with corresponding flanges of the base and top sections 45A,45B, creating a sealing interface (which may also be provided with a sealing member, such as a gasket). Thus, in the configuration of the battery enclosure 42 shown in FIGS. 5A to 5C, an efficient metal frame (i.e. the middle section 45C) supports the weight of the batteries 18, and two enclosures (i.e. the base and top sections 45A,45B) help to seal out liquid and gases and protect electrical coverings. Such a battery enclosure 42 may allow for the use of high volume and inexpensive manufacturing methods including, but not limited to, automation (robotic welding), extrusion, casting, and injection molding. The base and middle sections 45A, 45C are permanently connected, such as by a welded, adhered, or mechanical fastener connection, and the top section 45B is removably and sealably mounted to the middle section 45C. It will be appreciated that any one, or a combination, of the base, top and middle sections 45A, 45B,45C may be a load-bearing or structural component which directly supports the weight of the batteries 18 thereon. Similarly, one or two of the base, top and middle sections 45A,45B,45C may provide only a sealing functionality.

Figure 5D:
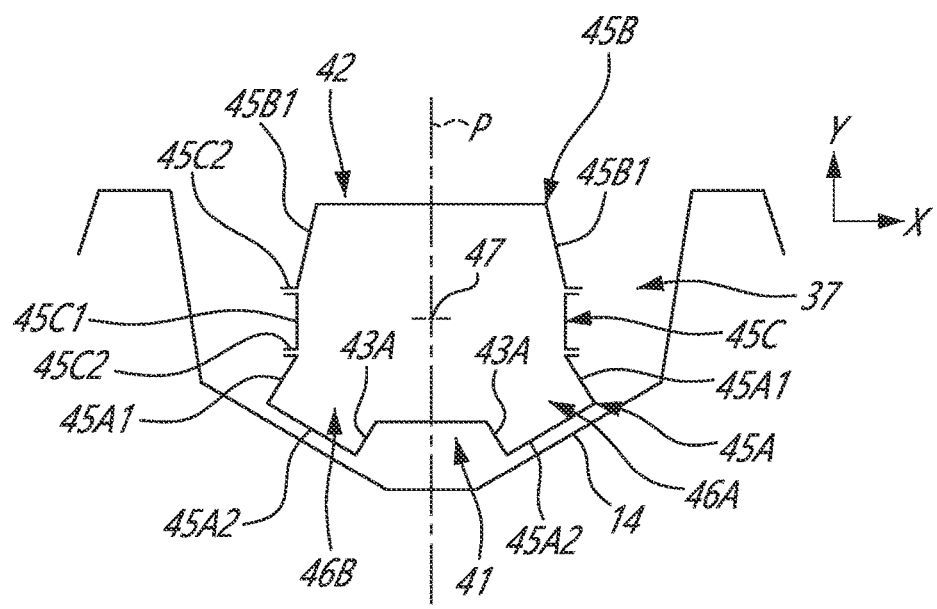
FIG. 5D is a rear schematic view of the battery enclosure of FIG. 5A within a hull of the watercraft.

Referring to FIGS. 5B and 5D, the base section 45A defines a longitudinal base center axis 47 which is parallel to the center axis 33 of the PWC 10. The base center axis 47 lies in a vertical plane P. The plane P is a symmetrical plane which divides the base section 45A into equal halves. The base section 45A includes part of the aft portion 44A of the battery enclosure 42, and part of the front portion 44B. The base section 45A includes internal side walls 43A along its aft portion 44A which delimit the passage 41. The internal side walls 43A are positioned on opposite sides of the base center axis 47, and spaced apart from each other along the Z-axis in the three-axes frame of reference of the PWC 10. The internal side walls 43A have an upright orientation (i.e. the magnitude of their length along the Y axis is much greater than the magnitude of their length along both the X and Z axes). The internal side walls 43A are inclined toward the vertical plane P. The internal side walls 43A lean toward the plane P, such that the bottom of the internal side walls 43A are spaced further apart from the plane P along the Z axis than the top of the internal side walls 43A.

The base section 45A also includes external side walls 45A1 along its aft portion 44A. The external side walls 45A1 are positioned on opposite sides of the base center axis 47, and spaced apart from each other along the Z-axis. The external side walls 45A1 are spaced closer toward the port and starboard sides 35A,35B of the PWC 10 than the internal side walls 43A. The external side walls 45A1 are spaced further from the base center axis 47 along the Z axis than the internal side walls 43A. The external side walls 45A1 have an upright orientation (i.e. the magnitude of their length along the Y axis is much greater than the magnitude of their length along both the X and Z axes). The external side walls 45A1 are also inclined toward the vertical plane P. The base section 45A also includes connecting walls 45A2 which extend between and join the internal and external side walls 43A,45A1. Referring to FIG. 5D, the external side walls 45B1 of the top section 45A along one or both of the aft and front portions 44A,44B of the battery enclosure 42 are also inclined toward the vertical plane P.

This configuration of the base section 45A along at least the aft portion 44A allows for the batteries 18 positioned in the base section 45A to form a non-zero angle with the vertical plane P, such that the batteries 18 are also inclined toward the vertical plane P, as shown in FIG. 5C. In an embodiment, the external side walls 45A1 of the base section 45A along the front portion 44B are also inclined toward the vertical plane P. By inclining the external side walls 45A1,45B1 of the battery enclosure 42 and the batteries 18 toward the vertical plane P, the angles of the walls of the V-shaped hull 14 may be angled closer to the vertical plane P. Inclining the external side walls 45A1,45B1 of the battery enclosure 42 and the batteries 18 toward the vertical plane P may also facilitate positioning the base and top sections 45A,45B within the interior volume 37. By inclining the internal side walls 43A toward the vertical plane P, the battery enclosure 42 allows for the formation of the passage 41, thereby accommodating the extension of the drive shaft 28 through the battery enclosure 42. By having the base and top sections 45A,45B of the battery enclosure 42 meet at the middle section 45C, the external side walls 45A1,45A2,45B1 of the battery enclosure 42 may have a wider draft angle, which may facilitate the manufacturing of the battery enclosure 42 while still providing an overall shape for the battery enclosure 42 that fits easily into the hull 14.

Referring to FIGS. 5B and 5C, base section 45A along the aft portion 44A of the battery enclosure 42 includes the starboard sub-enclosure 46A and the port sub-enclosure 46B. Inner surfaces of each of the inner side walls 43A, the external side walls 45A1, and the connecting walls 45A2 delimit and define the starboard and port sub-enclosures 46A,46B.

Alternate configurations of the battery enclosure 42 are possible, some of which are described in greater detail below. For example, in an embodiment, the battery enclosure 42 is composed of only one section, or of more than three sections. In another possible embodiment, the single battery enclosure 42 composed of the three sections 45A, 45B,45C may be separate battery enclosures 42. The sections 45A,45B,45C may be manufactured in any suitable way including stamping, injection molding, and welding, and may be made of any suitable materials including polymers, composites and metals. The top section 45B includes the removable top wall 48A, or the entirety of the top section 45B is removable to permit access to the battery enclosure volume 44E.

Figure 6A:
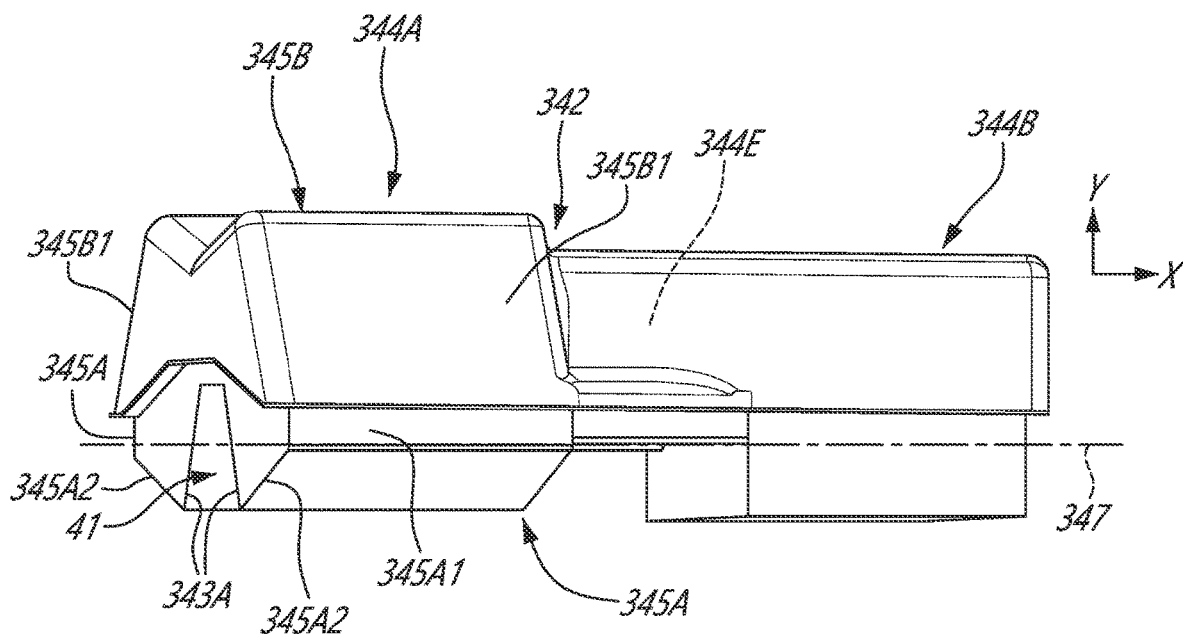
FIG. 6A is a perspective view of another battery enclosure of the battery pack.
Figure 6B:
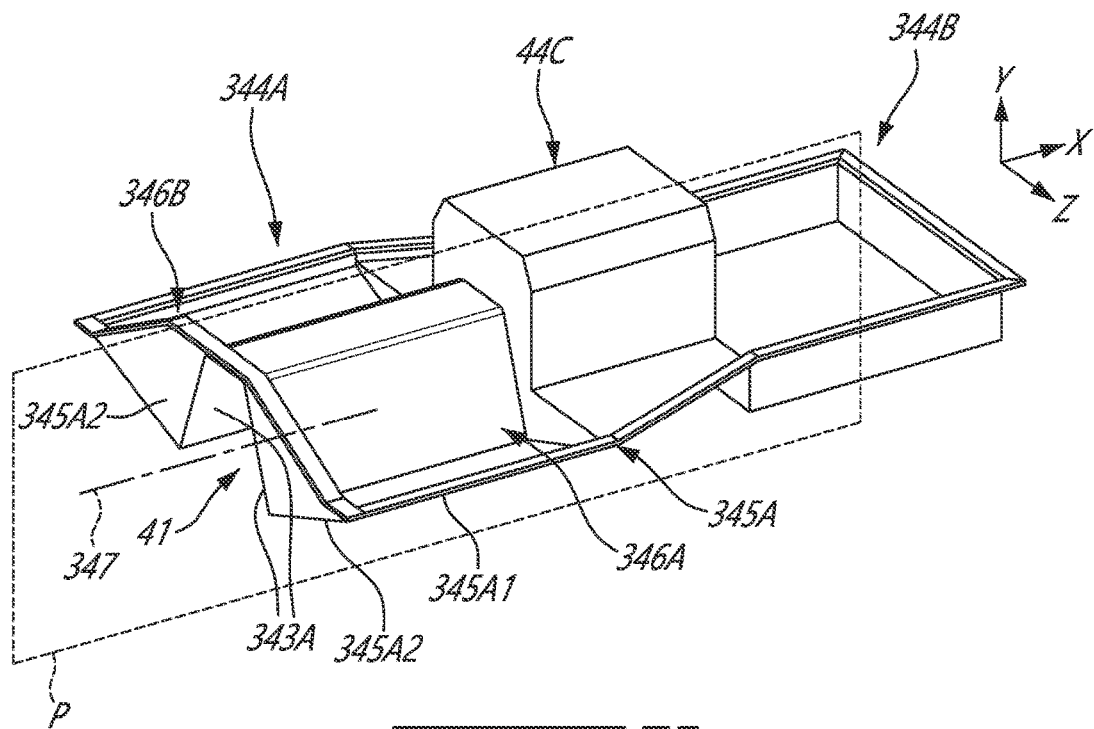
FIG. 6B is a perspective view of a base portion of the battery enclosure of FIG. 6A.

Another possible configuration of the battery enclosure 342 is shown in FIGS. 6A and 6B. The description, function, attributes and benefits of the features of the battery enclosure 42 in FIGS. 1 to 5D provided above apply mutatis mutandis to the same features shown in FIGS. 6A to 6B.

Referring to FIGS. 6A to 6B, the battery enclosure 342 is composed of two sections. The battery enclosure 342 includes a base section 345A and a top section 345B. The base section 345A defines the bottom of the battery enclosure 342 and is positioned closest to the bottom of the hull 14. The base section 345A may be a load-bearing or structural component which directly supports the weight of the batteries 18 thereon. The top section 345B is vertically spaced apart from the base section 345A so as to define the battery enclosure volume 344E of the battery enclosure 342. Once the base and top sections 345A,345B are connected together, a seal is formed or defined which prevents the ingress of water or gas into the battery enclosure volume 344E. In such a configuration, the battery enclosure 342 has a single sealing interface between the base section 345A and the top section 345B. The base and top sections 345A,345B are removably and sealably connected.

Referring to FIGS. 6A and 6B, the base section 345A defines a longitudinal base center axis 347 which is parallel to the center axis 33 of the PWC 10. The base center axis 347 lies in a vertical plane P. The plane P is a symmetrical plane which divides the base section 345A into equal halves. The base section 345A includes part of the aft portion 344A of the battery enclosure 342, and part of the front portion 344B. The base section 345A includes internal side walls 343A along its aft portion 344A which delimit the passage 341. The internal side walls 343A are positioned on opposite sides of the base center axis 347, and spaced apart from each other along the Z-axis in the three-axes frame of reference of the PWC 10. The internal side walls 343A have an upright orientation (i.e. the magnitude of their length along the Y axis is much greater than the magnitude of their length along both the X and Z axes). The internal side walls 343A are inclined toward the vertical plane P.

The base section 345A also includes external side walls 345A1 along its aft portion 344A. The external side walls 345A1 are positioned on opposite sides of the base center axis 347, and spaced apart from each other along the Z-axis. The external side walls 345A1 are spaced closer toward the port and starboard sides 35A,35B of the PWC 10 than the internal side walls 343A. The external side walls 345A1 are spaced further from the base center axis 347 along the Z axis than the internal side walls 343A. The external side walls 345A1 have an upright orientation (i.e. the magnitude of their length along the Y axis is much greater than the magnitude of their length along both the X and Z axes). The external side walls 345A1 may be inclined toward the vertical plane P or parallel thereto. The base section 345A also includes connecting walls 345A2 which extend between and join the internal and external side walls 343A,345A1. Referring to FIG. 6A, the external side walls 345B1 of the top section 345A along one or both of the aft and front portions 344A,344B of the battery enclosure 342 are also inclined toward the vertical plane P.

This configuration of the base section 345A along at least the aft portion 344A allows for the batteries 18 positioned in the base section 345A to form a non-zero angle with the vertical plane P, such that the batteries 18 are also inclined toward the vertical plane P. In an embodiment, the external side walls 345A1 of the base section 345A along the front portion 344B are also inclined toward the vertical plane P. By inclining the external side walls 345A1,345B1 of the battery enclosure 342 and the batteries 18 toward the vertical plane P, the angles of the walls of the V-shaped hull 14 may be angled closer to the vertical plane P, for improved positioning within the interior volume 37 of the PWC 10. Inclining the external side walls 345A1,345B1 of the battery enclosure 342 and the batteries 18 toward the vertical plane P may also facilitate positioning the base and top sections 345A,345B within the interior volume 37. By inclining the internal side walls 343A toward the vertical plane P, the battery enclosure 342 allows for the formation of the passage 41, thereby accommodating the extension of the drive shaft 28 through the battery enclosure 342.

Referring to FIG. 6B, base section 345A along the aft portion 344A of the battery enclosure 342 includes the starboard sub-enclosure 346A and the port sub-enclosure 346B. Inner surfaces of each of the inner side walls 343A, the external side walls 345A1, and the connecting walls 345A2 delimit and define the starboard and port sub-enclosures 346A,346B.

Referring to FIGS. 2C and 7, the bridge portion 44C located between the aft and front portions 44A,44B may house other components of the electric drive system 20. Referring to FIG. 7, which shows part of the bridge portion 44C without its sealing cover, a high-voltage (HV) module 49 may be positioned in the bridge portion 44C between the forward and aft battery modules 18. The bridge portion 44C defines an enclosed and sealed volume which forms part of the battery enclosure volume 44E, and provides a storage place for components of the electric drive system 20 other than the batteries 18 and the electric motor 16 (e.g. HV assemblies, chargers, and other battery electronics). Referring to FIG. 2C, the electric motor 16 may be housed beneath the bridge portion 44C and between the aft and front portions 44A,44B. In some examples, the electric motor 16 may be housed in its own sealed enclosure. The sealed volume of air captured in the bridge portion 44C may also help the PWC 10 to meet its buoyancy requirements in the event of water ingress into the hull 14.

Another possible configuration of the battery pack 440 is shown in FIG. 8.

The description, function, attributes and benefits of the features of FIGS. 1 to 7 provided above apply mutatis mutandis to the same features shown in FIG. 8. The battery enclosure 442 of the battery pack 440 includes an aft portion 444A which is positioned vertically above the electric motor 16. The battery enclosure 442 also includes a front portion 444B positioned in front of the electric motor 16. Some of the batteries 18 in the aft portion 444A are axially positioned along the center axis 33 in line with, and above along the Y axis, the electric motor 16, and some of the batteries of the aft portion 444A are axially positioned along the center axis 33 in front of the electric motor 16. All of the batteries 18 of the aft portion 444A of the battery enclosure 442 are positioned above the drive shaft 28 along the Y axis. This configuration of the battery enclosure 442 may help to decrease the length of the drive shaft 28. This configuration of the battery enclosure 442 may help to position the CG of the PWC 10 as desired, or to vary its position by adding or removing batteries 18.

Another possible configuration of the battery pack 540 is shown in FIG. 9.

The description, function, attributes and benefits of the features of FIGS. 1 to 8 provided above apply mutatis mutandis to the same features shown in FIG. 9. The battery pack 540 includes multiple distinct and separated battery enclosures 542. The aft battery enclosures 542A are positioned vertically above the electric motor 16 along the Y axis, while the front battery enclosures 542B are positioned in front of the electric motor 16. Some of the batteries 18 in the aft battery enclosures 542A are axially positioned along the center axis 33 between the impeller 15 and the electric motor 16, some of the batteries 18 in the aft battery enclosures 542A are axially positioned along the center axis 33 in line with and above the electric motor 16 along the Y axis, and some of the batteries 18 in the aft battery enclosures 542A are axially positioned along the center axis 33 in front of the electric motor 16. All of the batteries 18 of the aft battery enclosures 542A are positioned above the drive shaft 28 along the Y axis. This configuration of the aft battery enclosures 542A may help to decrease the length of the drive shaft 28. This configuration of the battery enclosures 542 may help to position the CG of the PWC 10 as desired, or to vary its position by adding or removing batteries 18.

Another possible configuration of the battery pack 640 is shown in FIG. 10. The description, function, attributes and benefits of the features of FIGS. 1 to 9 provided above apply mutatis mutandis to the same features shown in FIG. 10. The battery pack 640 includes multiple distinct and separated battery enclosures 642. The aft battery enclosures 642A are positioned vertically above the electric motor 16 along the Y axis, while the front battery enclosures 642B are positioned in front of the electric motor 16 along the center axis 33. Some of the batteries 18 in the aft battery enclosures 642A are axially positioned along the center axis 33 between the impeller 15 and the electric motor 16, and some of the batteries 18 in the aft battery enclosures 642A are axially positioned along the center axis 33 in front of the electric motor 16. All of the batteries 18 of the aft battery enclosures 642A are positioned above the drive shaft 28 along the Y axis. This configuration of the aft battery enclosures 642A may help to decrease the length of the drive shaft 28. This configuration of the battery enclosures 642 may help to position the CG of the PWC 10 as desired, or to vary its position by adding or removing batteries 18.

Referring to FIGS. 2A to 2C, there are also disclosed methods of configuring the PWC 10. The term "configuring" denotes manufacturing, assembling, installing, modifying, repairing or retrofitting the PWC 10 or one or more of its components.

One possible method of configuring the PWC 10 includes positioning the battery enclosure 42-642 within the interior volume 37 to locate at least one battery 18 above the drive shaft 28. Another possible method of configuring the PWC 10 includes positioning the battery enclosure 42-642 within the interior volume 37 to locate the aft portion 44A of the battery enclosure 42-642 rearward of the electric motor 16, and to locate the front portion 44B forward of the electric motor 16. Another possible method of configuring the PWC 10 includes positioning the drive shaft 28 to extend through the passage 41 of the battery enclosure 42-642.

Another possible method of configuring the PWC 10 includes positioning the battery enclosure 42-642 within the interior volume 37. This includes positioning the top section 45B apart from the base section 45A to define the inner volume 44E. This also includes connecting the middle section 45C to the base and top sections 45A,45B to seal the inner volume 44E.

The embodiments described in this document provide non-limiting examples of possible implementations of the present technology. Upon review of the present disclosure, a person of ordinary skill in the art will recognize that changes may be made to the embodiments described herein without departing from the scope of the present technology.

For example, although some of the configurations of the battery enclosure 42-642 are described or shown separately, the features of all battery enclosures 42-642 may be combined. Yet further modifications could be implemented by a person of ordinary skill in the art in view of the present disclosure, which modifications would be within the scope of the present technology.

The invention claimed is:

1. A personal watercraft, comprising:
a deck and a hull defining an interior volume;
an electric motor housed within the interior volume, the electric motor operable to rotate a drive shaft, the drive shaft including an internal segment within the interior volume and an external segment outside of the interior volume, the external segment in driving engagement with an impeller; and
a battery pack having a battery enclosure housing one or more batteries, the battery pack positioned within the interior volume and a portion of at least one battery of the one or more batteries positioned vertically above the drive shaft, the battery enclosure having a top wall, at least part of the top wall being removable to access an interior of the battery enclosure.

2. The personal watercraft of claim 1, wherein a portion of at least one battery is between the impeller and the electric motor along a center axis of the personal watercraft.

3. The personal watercraft of claim 1, wherein the battery enclosure includes an aft portion disposed rearward of the electric motor, a front portion disposed forward of the electric motor, and a bridge portion extending between the aft and front portions.

4. The personal watercraft of claim 3, wherein the battery enclosure straddles the electric motor.

5. The personal watercraft of claim 1, wherein the battery enclosure comprises a base section defining a bottom of the battery enclosure, a top section defining the top wall and spaced apart from the base section to define an inner volume of the battery enclosure, and a middle section extending between and connecting the base and top sections.

6. The personal watercraft of claim 1, wherein the battery enclosure comprises a base section defining a bottom of the battery enclosure and a top section defining the top wall and mountable to the base section to define an inner volume of the battery enclosure.

7. A personal watercraft, comprising:
a deck and a hull defining an interior volume;
a battery pack housed within the interior volume, the battery pack having a battery enclosure housing one or more batteries, the battery enclosure comprising a base section defining a bottom of the battery enclosure and a top section mountable to the base section to define an inner volume of the battery enclosure, the battery enclosure defining a passage; and
an electric motor housed within the interior volume, the electric motor operable to rotate a drive shaft mounted to an impeller, part of the drive shaft extending through the passage.

8. The personal watercraft of claim 7, wherein the hull comprises an intake opening, the drive shaft extending through the intake opening.

9. The personal watercraft of claim 7, wherein the base section of the battery enclosure has walls delimiting the passage outside of the battery enclosure.

10. The personal watercraft of claim 7, wherein the battery enclosure includes an aft portion disposed rearward of the electric motor, the passage defined in the aft portion.

11. The personal watercraft of claim 7, wherein the battery enclosure includes an aft portion disposed rearward of the electric motor, the aft portion having a starboard sub-enclosure on a starboard side of the drive shaft and a port sub-enclosure on a port side of the drive shaft.

12. The personal watercraft of claim 11, wherein some of the one or more batteries are housed within the starboard sub-enclosure, and some of the one or more batteries are housed within the port sub-enclosure.

13. The personal watercraft of claim 11, wherein the passage is defined between the starboard sub-enclosure and the port sub-enclosure.

14. The personal watercraft of claim 7, wherein the battery enclosure comprises a middle section extending between and connecting the base and top sections.

15. A personal watercraft, comprising:
a deck and a hull defining an interior volume;
an electric drive system housed within the interior volume, the electric drive system comprising an electric motor and one or more batteries; and
a battery enclosure housing the one or more batteries, the battery enclosure comprising an aft portion disposed rearward of the electric motor, a front portion disposed forward of the electric motor, and a bridge portion extending between the aft and front portions.

16. The personal watercraft of claim 15, wherein some of the one or more batteries are housed within the aft portion of the battery enclosure, and some of the one or more batteries are housed within the front portion of the battery enclosure.

17. The personal watercraft of claim 15, wherein the aft, front and bridge portions of the battery enclosure define a single enclosure volume.

18. The personal watercraft of claim 15, wherein at least some of the bridge portion is positioned above the electric motor.

19. The personal watercraft of claim 15, wherein a component of the electric drive system other than the electric motor and the one or more batteries is housed within the bridge portion of the battery enclosure.

20. The personal watercraft of claim 19, wherein the component of the electric drive system comprises a high-voltage module.

* * * * *